(12) United States Patent
Tanishima et al.

(10) Patent No.: US 8,996,217 B2
(45) Date of Patent: Mar. 31, 2015

(54) CONTROL DEVICE FOR HYBRID VEHICLE

(75) Inventors: Kaori Tanishima, Isehara (JP); Hiroaki Kawamura, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 67 days.

(21) Appl. No.: 13/881,291

(22) PCT Filed: Oct. 24, 2011

(86) PCT No.: PCT/JP2011/074446
§ 371 (c)(1),
(2), (4) Date: Apr. 24, 2013

(87) PCT Pub. No.: WO2012/057085
PCT Pub. Date: May 3, 2012

(65) Prior Publication Data
US 2013/0226384 A1  Aug. 29, 2013

(30) Foreign Application Priority Data
Oct. 26, 2010  (JP) ................. 2010-239388

(51) Int. Cl.
*B60W 20/00* (2006.01)
*B60W 10/02* (2006.01)
*B60W 10/08* (2006.01)
(Continued)

(52) U.S. Cl.
CPC .............. *B60W 20/40* (2013.01); *B60K 6/48* (2013.01); *B60L 11/123* (2013.01); *B60L 11/14* (2013.01); *B60W 10/02* (2013.01); *B60W 10/06* (2013.01); *B60W 10/08* (2013.01); *B60L 11/1861* (2013.01); *B60L 15/2045* (2013.01); *Y02T 10/6221* (2013.01); *B60W 2510/0604* (2013.01); *B60W 2710/025* (2013.01); *B60W 2710/083* (2013.01); *Y02T 10/7077* (2013.01); *Y02T 10/6286* (2013.01); *Y02T 10/70* (2013.01); *B60W 2600/00* (2013.01); *Y10S 903/93* (2013.01); *Y02T 10/6217* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/507* (2013.01); *B60L 2240/80* (2013.01);
(Continued)

(58) Field of Classification Search
None
See application file for complete search history.

(56) References Cited

U.S. PATENT DOCUMENTS

| 4,653,621 | A  | * | 3/1987 | Oshiage ..................... 477/175 |
| 7,017,692 | B2 | * | 3/2006 | Grassl et al. ................ 180/65.25 |
| 7,343,993 | B2 | * | 3/2008 | Dong et al. ................ 180/65.23 |
| 2004/0038774 | A1 | * | 2/2004 | Kuroda et al. .................... 477/3 |

(Continued)

FOREIGN PATENT DOCUMENTS

| JP | 2000-225861 A | 8/2000 |
| JP | 2007-069790 A | 3/2007 |

(Continued)

*Primary Examiner* — Mussa A Shaawat
(74) *Attorney, Agent, or Firm* — Foley & Lardner LLP

(57) ABSTRACT

A start operation is continuously performed until the internal combustion engine starts even when an accelerator pedal opening decreases between initiation and termination of the start operation of the internal combustion engine, and an EV mode is selected again. A motor/generator is controlled such that a torque of the motor/generator exerting to reduce a slippage of the second clutch increases as the accelerator pedal opening decreases during control of the second clutch to start the internal combustion engine, compared to a case where the accelerator pedal opening does not decrease during mode switching.

10 Claims, 16 Drawing Sheets

(51) Int. Cl.
*B60K 6/48* (2007.10)
*B60L 11/12* (2006.01)
*B60L 11/14* (2006.01)
*B60W 10/06* (2006.01)
*B60L 11/18* (2006.01)
*B60L 15/20* (2006.01)

(52) U.S. Cl.
CPC ... *B60L 2270/145* (2013.01); *B60K 2006/4825* (2013.01); *B60W 2540/10* (2013.01)
USPC .......................... 701/22; 180/65.245; 903/930

(56) References Cited

U.S. PATENT DOCUMENTS

| | | |
|---|---|---|
| 2007/0056784 A1 | 3/2007 | Joe et al. |
| 2007/0227790 A1* | 10/2007 | Tanishima .................. 180/65.2 |
| 2008/0076623 A1* | 3/2008 | Tabata et al. ..................... 477/5 |

FOREIGN PATENT DOCUMENTS

| | | |
|---|---|---|
| JP | 2007-069817 A | 3/2007 |
| JP | 2010-143423 A | 7/2010 |

* cited by examiner

CONTROL DEVICE FOR HYBRID VEHICLE

TECHNICAL FIELD

The present invention relates to a control device for a hybrid vehicle having an internal combustion engine and a motor/generator as a drive source.

BACKGROUND ART

There is known a hybrid vehicle having an internal combustion engine and a motor/generator as a drive source and capable of operating in an electric vehicle (EV) mode in which a vehicle travels using power only from the motor/generator and in a hybrid electric vehicle (HEV) mode in which a vehicle travels using power from both the internal combustion engine and the motor/generator. As an example of a hybrid vehicle drive apparatus, JP2007-69817A discloses a configuration in which an internal combustion engine, a motor/generator, and a transmission are arranged in series, a first clutch is interposed between the internal combustion engine and the motor/generator, and a second clutch is interposed between the motor/generator and the transmission.

The control device for a hybrid vehicle discussed in JP2007-69817A releases the first clutch and engages the second clutch in the EV mode. In the HEV mode, the control device engages both the first and second clutches. Switching from the EV mode to the HEV mode is performed in a case where it is necessary to output power from the internal combustion engine when a user steps on an accelerator pedal during the EV mode, or in a case where a battery charge level is lowered.

For switching from the EV mode to the HEV mode, this control device causes the internal combustion engine to start through cranking by virtue of a drag torque of the first clutch while the second clutch slips. In this manner, by causing the second clutch to slip, the engagement of the first clutch progresses, and a torque change generated in the start of the internal combustion engine is prevented from being transferred to a drive wheel.

SUMMARY OF THE INVENTION

In the technique discussed in JP2007-69817A, it is assumed that a driver steps on the accelerator pedal in a case where switching from the EV mode to the HEV mode is performed by pressing the accelerator pedal. In addition, the second clutch is engaged if the internal combustion engine starts, the engine torque is stabilized, and a hydraulic pressure for engaging the second clutch is obtained. Otherwise, the second clutch remains in a slip state.

On the other hand, in a case where switching from the EV mode to the HEV mode is determined, even when the accelerator pedal is recovered after the start control for the internal combustion engine is initiated, the engine stops after the start control is performed to start the internal combustion engine.

In this case, the slip control for the second clutch is also initiated in order to absorb a torque change caused by the start of the internal combustion engine. This slip control is continuously performed until the engine torque is stabilized as described above. Therefore, even when the internal combustion engine stops immediately after complete combustion of the internal combustion engine as the accelerator pedal is released, a sense of deceleration is not generated until the slip of the second clutch is removed.

That is, in the control discussed in JP2007-69817A, in a case where the accelerator pedal is released during the start of the internal combustion engine at the time of switching from the EV mode to the HEV mode, there is room for improvement for shortening time elapsing until a sense of deceleration is generated.

It is therefore an object of this invention to provide a control device capable of quickly generating a sense of deceleration in a case where the accelerator pedal is recovered during the control for starting the internal combustion engine at the time of switching from the EV mode to the HEV mode in the hybrid vehicle described above.

According to an aspect of the present invention, a torque of the motor/generator exerting to reduce a slippage of the second clutch increases as the accelerator pedal opening decreases during control of the second clutch to start the internal combustion engine for mode switching from the electric vehicle mode to the hybrid electric vehicle mode, compared to a case where the accelerator pedal opening does not decrease during the slip control. As a result, the time elapsing until the slip of the second clutch is converged is shortened, and a sense of deceleration is quickly generated.

The foregoing and additional features and characteristics of this disclosure will become more apparent from the following detailed description considered with the reference to the accompanying drawings.

DESCRIPTION OF EMBODIMENTS

Figure 1:
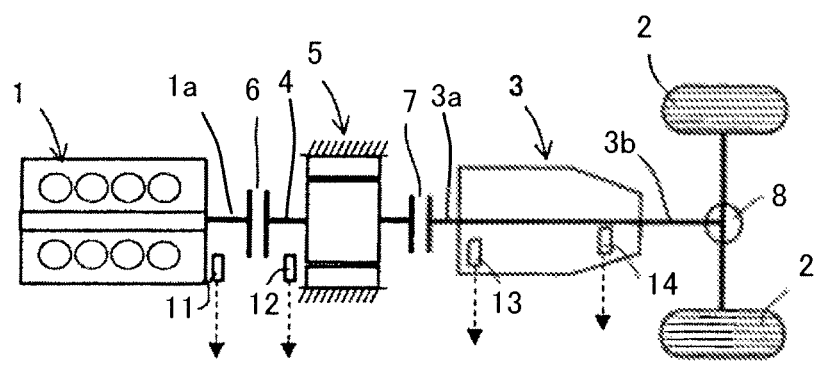
FIG. 1 is a schematic plan view illustrating a power train of a hybrid vehicle to which the present invention can be applied.

FIG. 1 illustrates a power train of a front-engine/rear-wheel drive vehicle (rear-wheel drive hybrid vehicle) including a hybrid drive apparatus where a start control device of an internal combustion engine according to the present invention can be applied.

In the power train of the hybrid vehicle of FIG. 1, similar to a typical rear-wheel drive vehicle, the internal combustion engine 1 is placed in a front side along a vehicle anteroposterior direction, the automatic transmission 3 is placed in a rear side, and a motor/generator 5 is combined with a shaft 4 configured to transmit rotation from the internal combustion engine 1 (crank shaft 1a) to an input shaft 3a of the automatic transmission 3.

The motor/generator 5 serving as either a motor or a generator (electric power generator) is placed between the internal combustion engine 1 and the automatic transmission 3.

A first clutch 6 is interposed between the motor/generator 5 and the internal combustion engine 1, and more specifically, between the shaft 4 and the internal combustion engine crank-shaft 1a, so that the internal combustion engine 1 and the motor/generator 5 are separably combined with each other through the first clutch 6.

Here, a transfer torque capacity of the first clutch 6 can change continuously or stepwise. For example, the first clutch 6 may be a wet-type multi-plate clutch capable of changing a transfer torque capacity by controlling a clutch hydraulic fluid flow and a clutch hydraulic pressure continuously or stepwise using a proportional solenoid.

A second clutch 7 is interposed between the motor/generator 5 and the automatic transmission 3, and more specifically, between the shaft 4 and the transmission input shaft 3a. The motor/generator 5 and the automatic transmission 3 are separably combined with each other through the second clutch 7.

Similar to the first clutch 6, a transfer torque capacity of the second clutch 7 can change continuously or stepwise. For example, the second clutch 7 may be a wet-type multi-plate clutch capable of changing a transfer torque capacity by controlling a clutch hydraulic fluid flow and a clutch hydraulic pressure continuously or stepwise using a proportional solenoid.

It is assumed that the automatic transmission 3 is the one described in pages C-9 to C-22 of "New Skyline Model (CV35)" issued by Nissan Motor Co., Ltd., on January 2003, and a power transmission path (gear position) is determined based on a combination of engagement and release of a plurality of frictional elements (such as a clutch or a brake) by selectively engaging or releasing such frictional elements.

Therefore, the automatic transmission 3 performs a gearshift for rotation from the input shaft 3a depending on a gear ratio corresponding to the selected gear position and outputs the rotation to the output shaft 3b.

This output rotation is distributed and transmitted to the left and right rear-wheels 2 through a differential gear unit 8 and is provided for a vehicle drive.

Although the aforementioned description relates to a gearshift type transmission, the invention is not limited thereto.

Needless to say, the invention may be applicable to a continuously variable transmission (CVT).

In the power train described above in conjunction with FIG. 1, when it is necessary to operate a vehicle in an electric vehicle (EV) mode used in a low load or a low vehicle speed such as a case where a vehicle starts from a stop state, the first clutch 6 is released, and the second clutch 7 is engaged to put the automatic transmission 3 into a power transfer state.

If the motor/generator 5 is driven in this state, only the output rotation from the motor/generator 5 is transferred to the transmission input shaft 3a, and the automatic transmission 3 performs a gearshift for the rotation to the input shaft 3a depending on a selected gear position and outputs the rotation from the transmission output shaft 3b.

Then, the rotation from the transmission output shaft 3b is transferred to the rear wheel 2 through the differential gear unit 8, and it is possible to cause a vehicle to travel in an electric vehicle (EV) mode only using the motor/generator 5.

In a case where it is necessary to operate a vehicle in a hybrid electric vehicle (HEV) mode used in a high-speed, a heavy load, and the like, both the first and second clutches 6 and 7 are engaged, and the automatic transmission 3 is set to a power transfer state.

In this state, both the output rotation from the internal combustion engine 1 and the output rotation from the motor/generator 5 are transferred to the transmission input shaft 3a, and the automatic transmission 3 performs a gearshift for the rotation to the input shaft 3a depending on the selected gear position and outputs the rotation from the transmission output shaft 3b.

Then, the rotation from the transmission output shaft 3b is transferred to the rear wheel 2 through the differential gear unit 8, and it is possible to cause a vehicle to travel in a hybrid electric vehicle (HEV) mode using both the internal combustion engine 1 and the motor/generator 5.

During the drive in such an HEV mode, in a case where energy remains if the internal combustion engine 1 is driven at an optimal fuel consumption, this surplus energy may be converted into electrical power by operating the motor/generator 5 as a generator, and the generated power may be stored in a battery for use in the motor driving of the motor/generator 5, so that it is possible to improve a fuel consumption of the internal combustion engine 1.

Figure 2:
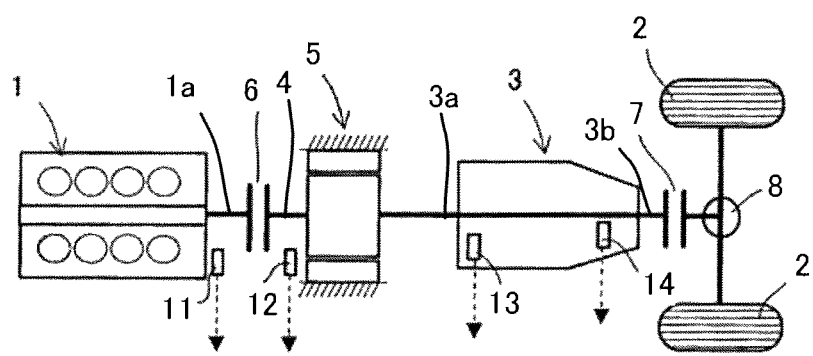
FIG. 2 is a schematic plan view illustrating a power train of another hybrid vehicle to which the present invention can be applied.

Although the first clutch 7 in which the motor/generator 5 and the drive wheel 2 are separably combined is interposed between the motor/generator 5 and the automatic transmission 3 in FIG. 1, the same functionality may be obtained by interposing the second clutch 7 between the automatic transmission 3 and the differential gear unit 8 as illustrated in FIG. 2.

In FIGS. 1 and 2, it is assumed that the second clutch 7 is dedicatedly added in a front or rear side of the automatic transmission 3. However, alternatively, a frictional element for selecting a forward drive gear position or a frictional element for selecting a backward drive gear position existing in the automatic transmission 3 may be used as the second clutch 7 as illustrated in FIG. 3.

In this case, the second clutch 7 performs the mode selection functionality described above and causes the automatic transmission to have a power transfer state when the second clutch 7 is engaged to perform this functionality. Therefore, it is highly advantageous in cost because the second clutch is not dedicatedly necessary.

Figure 3:
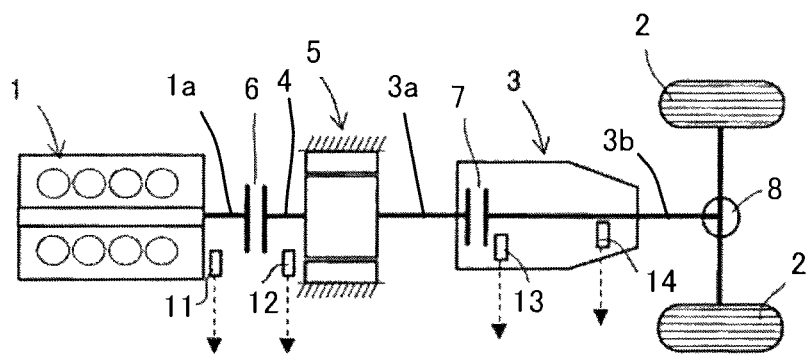
FIG. 3 is a schematic plan view illustrating a power train of still another hybrid vehicle to which the present invention can be applied.
Figure 4:
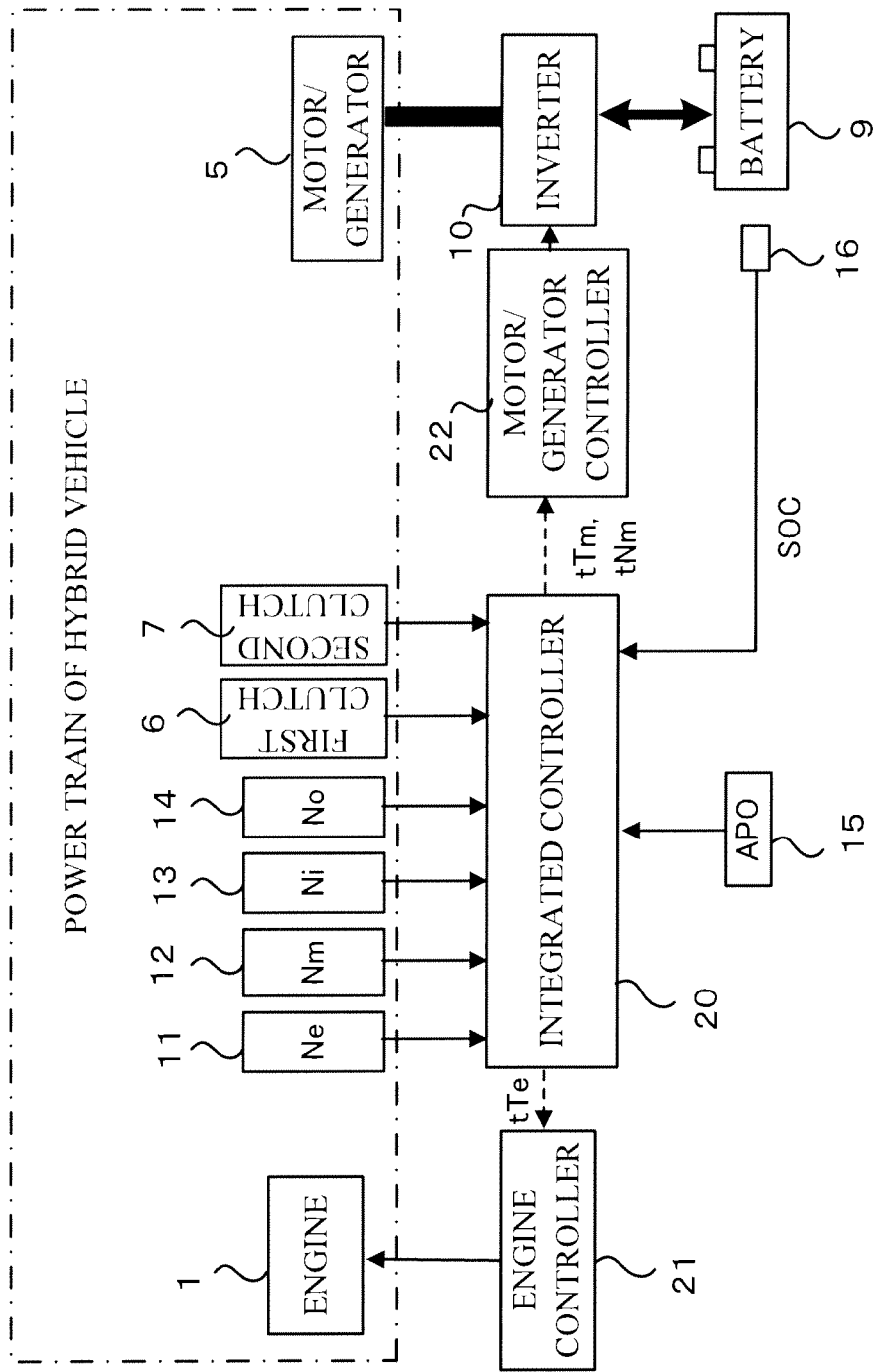
FIG. 4 is a block diagram illustrating a control system of the power train of FIG. 3.

The internal combustion engine 1, the motor/generator 5, the first and second clutches 6 and 7 included in the power train of the hybrid vehicle illustrated in FIGS. 1 to 3 are controlled using the system illustrated in FIG. 4.

In the following description, it is assumed that the power train of FIG. 1 is employed.

The control system of FIG. 4 has an integrated controller 20 that integratedly controls an operational point of the power train and defines an operational point of the power train based on a target engine torque tTe, a target motor/generator torque tTm (also referred to as a target motor/generator rotational speed tNm), a target transfer torque capacity tTc1 of the first clutch 6, and a target transfer torque capacity tTc2 of the second clutch 7.

In order to determine the operational point of the power train described above, the integrated controller 20 receives a signal from an engine rotation sensor 11 that detects an engine rotational speed Ne, a signal from a motor/generator rotation sensor 12 that detects a motor/generator rotational speed Nm, a signal from an input rotation sensor 13 that detects a transmission input rotational speed Ni, a signal from an output rotation sensor 14 that detects a transmission output rotational speed No, a signal from an accelerator pedal opening sensor 15 that detects an accelerator pedal opening (APO) indicating a desired load state of the internal combustion engine 1, and a signal from a charge state sensor 16 that detects a state of charge (SOC) (or available electric power) in the battery 9 which stores electric power for the motor/generator 5.

In addition, out of the sensors described above, the engine rotation sensor 11, the motor/generator rotation sensor 12, the input rotation sensor 13, and the output rotation sensor 14 may be arranged as illustrated in FIGS. 1 to 3.

The integrated controller 20 selects a driving mode (EV mode or HEV mode) capable of implementing a vehicle drive force desired by a driver based on the accelerator pedal opening (APO), the state of charge (SOC) of the battery, and the transmission output rotational speed No (vehicle speed VSP) out of the input information described above. In addition, the integrated controller 20 computes the target engine torque tTe, the target motor/generator torque tTm (or target motor/generator rotational speed tNm), the target first-clutch transfer torque capacity tTc1, and the target second-clutch transfer torque capacity tTc2.

The target engine torque tTe is supplied to the engine controller 21, and the target motor/generator torque tTm (or target motor/generator rotational speed tNm) is supplied to the motor/generator controller 22.

The engine controller 21 controls the internal combustion engine 1 such that the engine torque Te becomes the target engine torque tTe. The motor/generator controller 22 controls the motor/generator 5 using the battery 9 and the inverter 10 such that the torque Tm (or rotational speed Nm) of the motor/generator 5 becomes the target motor/generator torque tTm (or target motor/generator rotational speed tNm).

The integrated controller 20 supplies the solenoid current corresponding to the target first-clutch transfer torque capacity tTc1 and the target second-clutch transfer torque capacity tTc2 to engagement control solenoids (not illustrated) of the first and second clutches 6 and 7. In addition, the integrated controller 20 controls engagement forces of the first and second clutches 6 and 7 respectively such that the transfer torque capacity Tc1 of the first clutch 6 matches the target transfer torque capacity tTc1, and the transfer torque capacity Tc2 of the second clutch 7 matches the target second-clutch transfer torque capacity tTc2.

Figure 5:
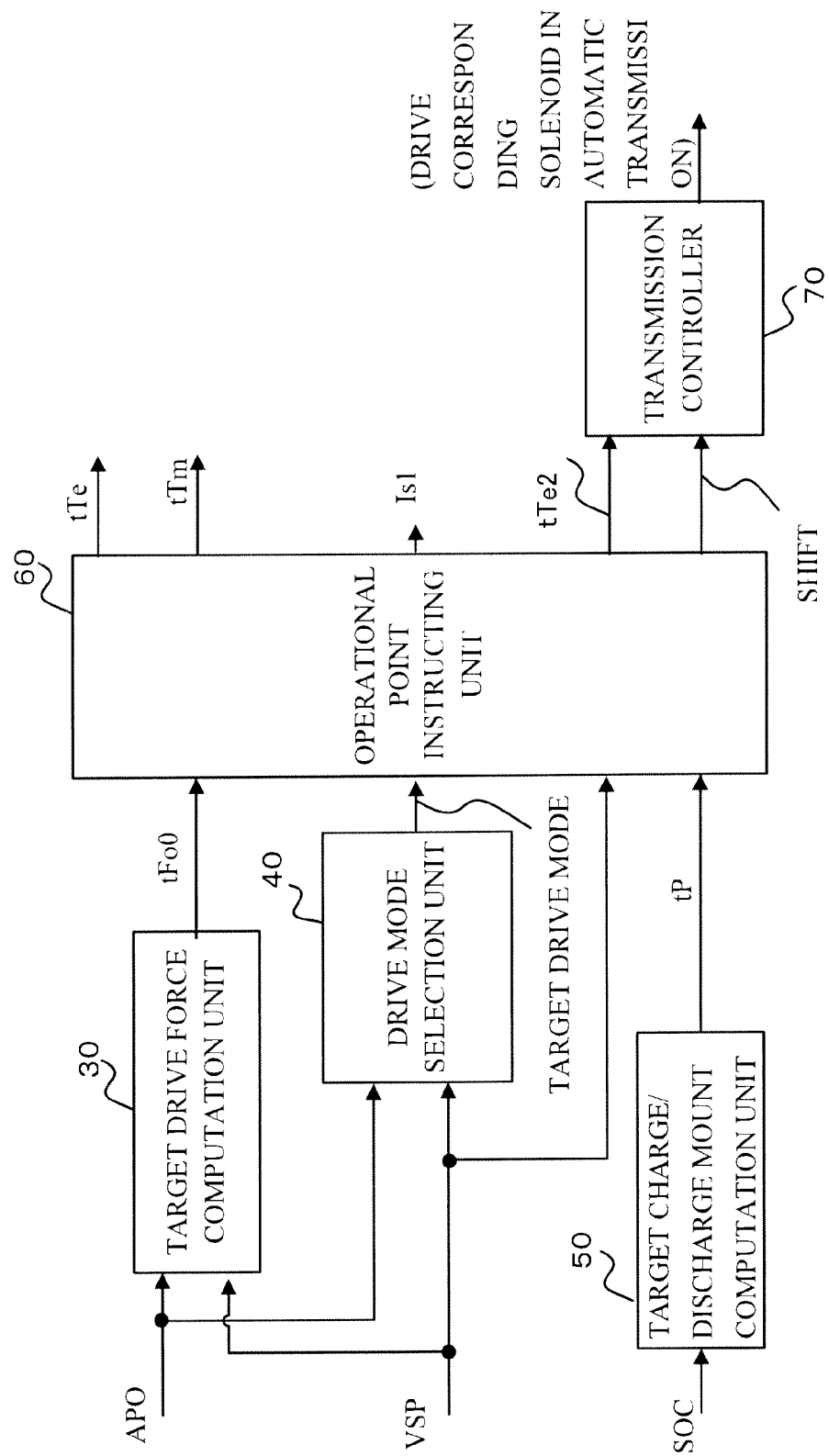
FIG. 5 is a functional block diagram illustrating an integrated controller in the control system of FIG. 4.

The integrated controller 20 selects the drive mode (EV mode or HEV mode) described above and computes the target engine torque tTe, the target motor/generator torque tTm (or target motor/generator rotational speed tNm), the target first-clutch transfer torque capacity tTc1, and the target second-clutch transfer torque capacity tTc2 as illustrated in the function block diagram of FIG. 5.

Figure 7:
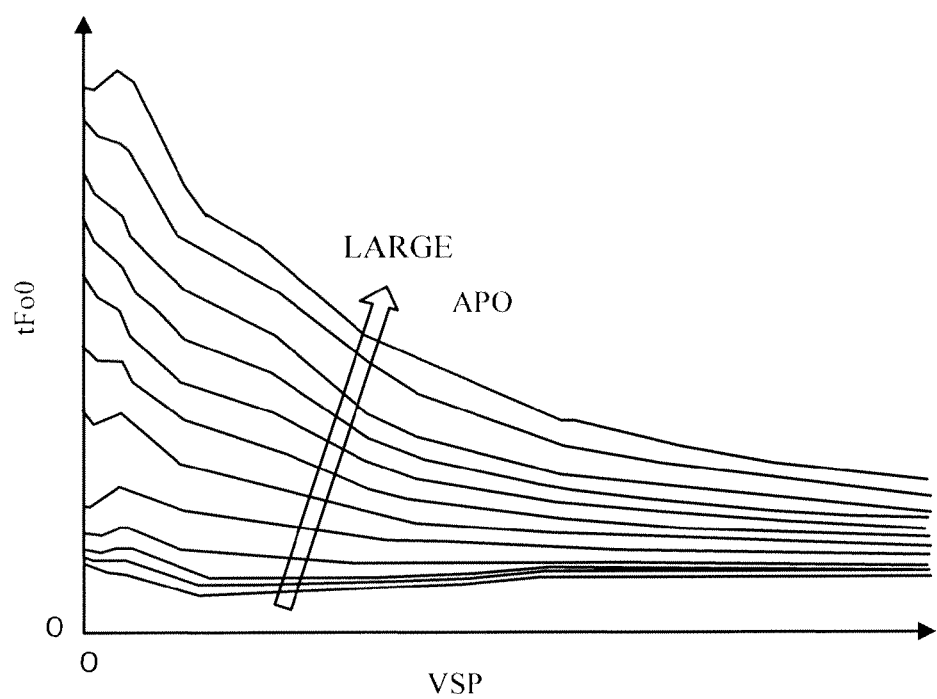
FIG. 7 is a graph illustrating a characteristic of an attainable target drive force used to obtain an attainable target drive force based on the flowchart of FIG. 6.

A target drive force computation unit 30 computes a steady attainable target drive force tFo0 based on the accelerator pedal opening APO and the vehicle speed VSP using the attainable target drive force map of FIG. 7.

Figure 8:
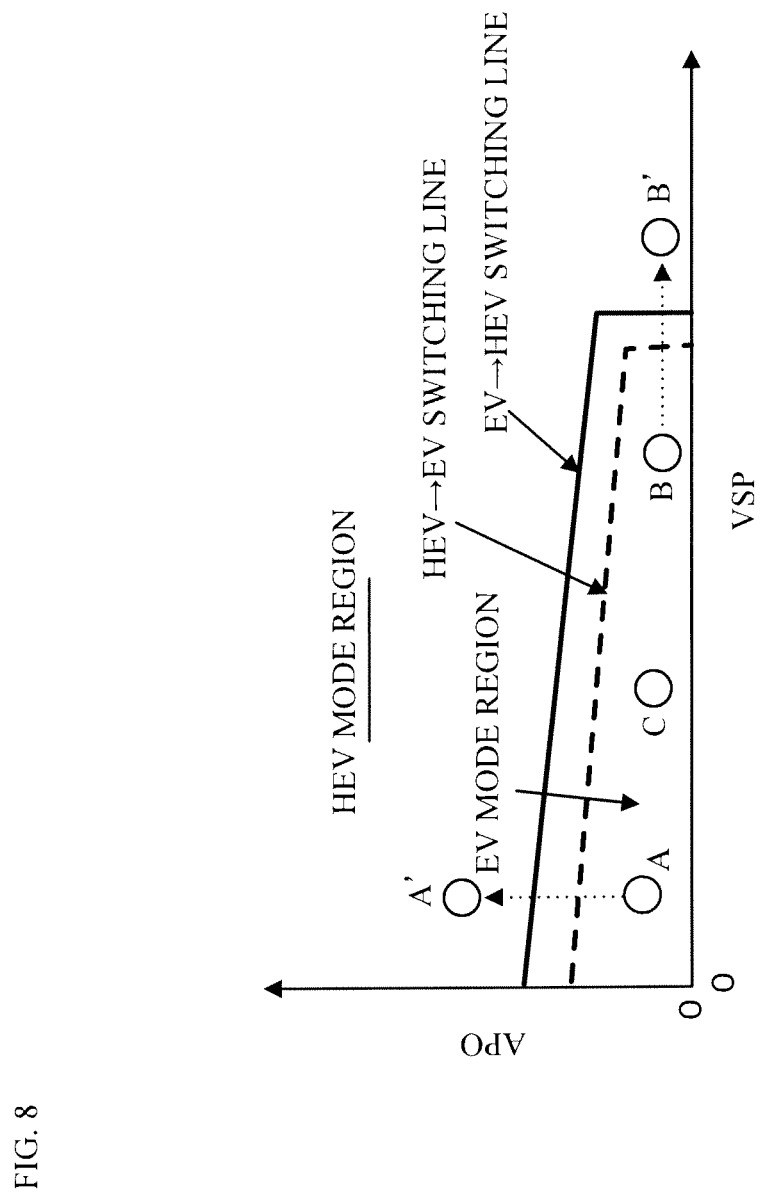
FIG. 8 is a graph illustrating an electric vehicle (EV) mode region and a hybrid electric vehicle (HEV) mode region of a hybrid vehicle.

A drive mode selection unit 40 determines a desired drive mode based on the accelerator pedal opening APO and the vehicle speed VSP using the EV-HEV region map of FIG. 8.

As apparent from the EV-HEV region map of FIG. 8, the HEV mode is selected in a high load or a high vehicle speed, and the EV mode is selected in a low load or a low vehicle speed. In addition, mode switching from the EV mode to the HEV mode is performed when the operational point defined as a combination of the accelerator pedal opening APO and the vehicle speed VSP exceeds the EV→HEV switching line and enters the HEV region during the EV mode. Furthermore, a mode switching from the HEV mode to the EV mode is performed when the operational point exceeds the HEV→EV switching line and enters the EV region during the HEV mode.

Figure 9:
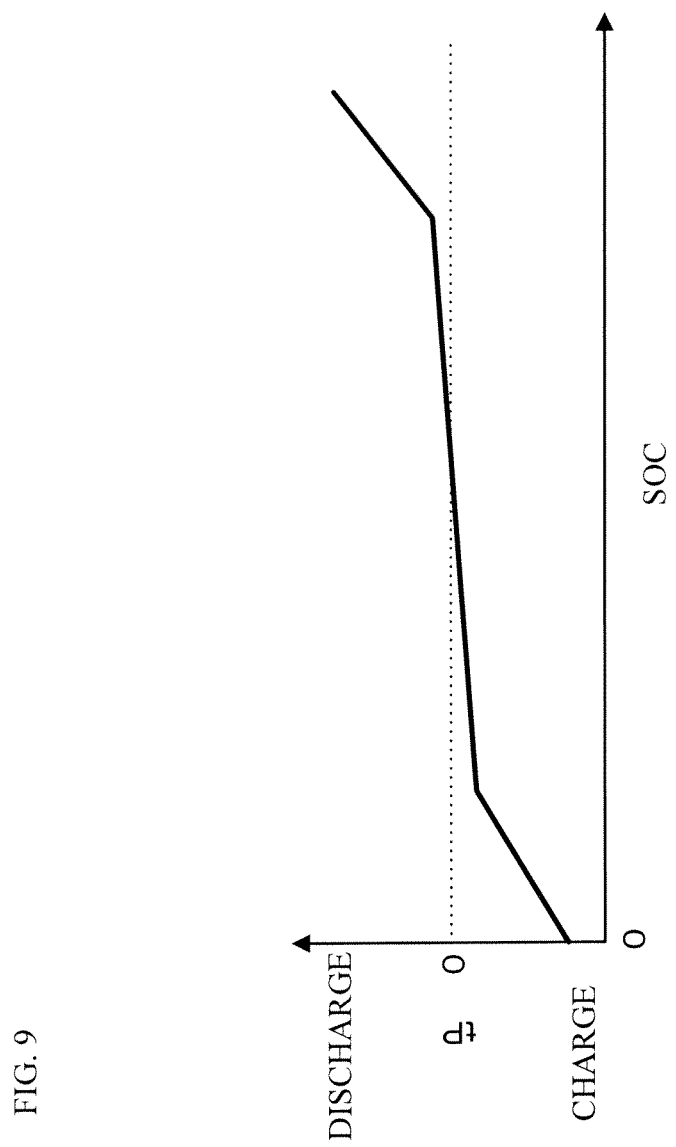
FIG. 9 is a graph illustrating a characteristic of a target charge/discharge mount against a battery charge condition of a hybrid vehicle.

A target charge/discharge mount computation unit 50 of FIG. 5 computes a target charge/discharge mount (electric power) tP based on the state of charge SOC of the battery using the charge/discharge capacity map of FIG. 9.

An operational point instructing unit 60 computes a momentary transitional target engine torque tTe, a target motor/generator torque tTm, a target solenoid current IS1 of the first clutch 6, a target transfer torque capacity tTc2 of the second clutch 7, and a target gearshift position SHIFT based on the accelerator pedal opening APO, the attainable target drive force tFo0, the target drive mode, the vehicle speed VSP, and the target charge/discharge electric power tP by setting these values to an attainable target of the operational point.

A transmission controller 70 receives the target second-clutch transfer torque capacity tTc2 and the target gear position SHIFT described above and drives a corresponding solenoid valve in the automatic transmission 3 so as to obtain the target second-clutch transfer torque capacity tTc2 and the target gear position SHIFT. As a result, engagement of the automatic transmission 3 of FIG. 3 is controlled to obtain the target second-clutch transfer torque capacity tTc2 of the second clutch 7, and the target gear position SHIFT becomes the selected power transfer state.

Figure 6:
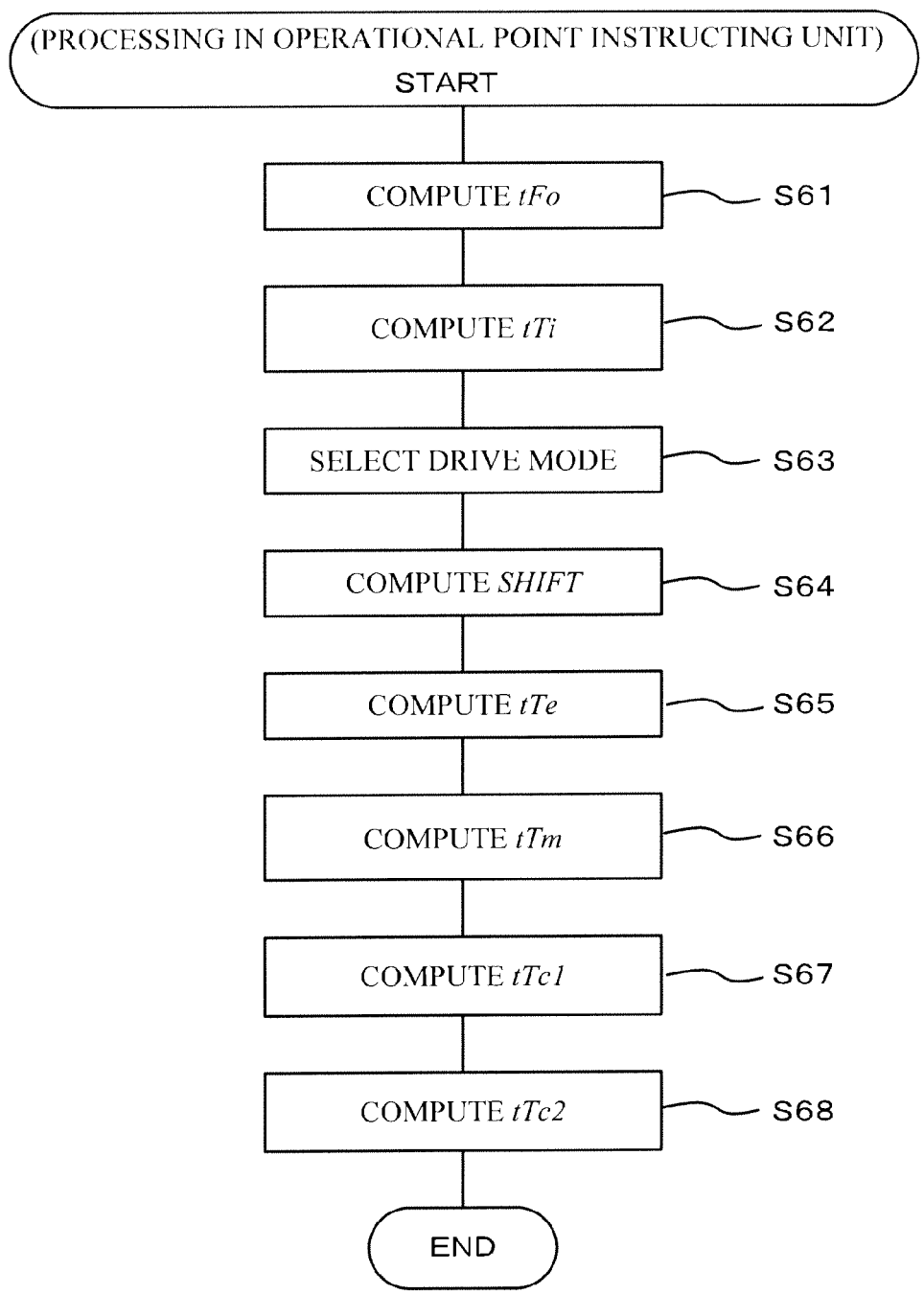
FIG. 6 is a flowchart illustrating a control program executed by an operational point instructing unit based on the functional block diagram of FIG. 5.

The operational point instructing unit 60 described above executes the control program of FIG. 6 to compute the transitional target engine torque tTe, the target motor/generator torque tTm, the target first-clutch solenoid current IS1, the target second-clutch transfer torque capacity tTc2, and the target gear position SHIFT.

In step S61, the operational point instructing unit 60 computes a transitional target drive force tFo necessary to switch from a current drive force to the attainable target drive force tFo0 described above with a predetermined unique response. In this computation, for example, output power obtained by passing the attainable target drive force tFo0 through a low-pass filter having a predetermined time constant may be used as the transitional target drive force tFo.

Subsequently, in step S62, the operational point instructing unit 60 obtains the target input torque tTi of the automatic transmission 3 necessary to obtain the transitional target drive force tFo based on the following equation.

$$tTi = tFo \times RTif/iG \qquad (1)$$

Here, Rt denotes an effective radius of a tire of the drive wheel 2, if denotes a final gear ratio, and iG denotes a gear ratio of the automatic transmission 3 defined by the current selected gear position.

In step S63, the operational point instructing unit 60 selects a drive mode depending on the target drive mode determined by the drive mode selection unit 40 of FIG. 5. Routinely, if the target driving mode is set to the EV mode, the EV mode is selected. If the target driving mode is set to the HEV mode, the HEV mode is selected. Mode switching from the HEV mode to the EV mode is performed if the target driving mode is set to the EV mode during the HEV mode. If the target drive mode is set to the HEV mode during the EV mode, mode switching is performed as described below according to the state transition diagram of FIG. 12, so that the mode switching from the EV mode to the HEV mode is executed, in which the start of the internal combustion engine 1 according to the present invention is generated.

Figure 10:
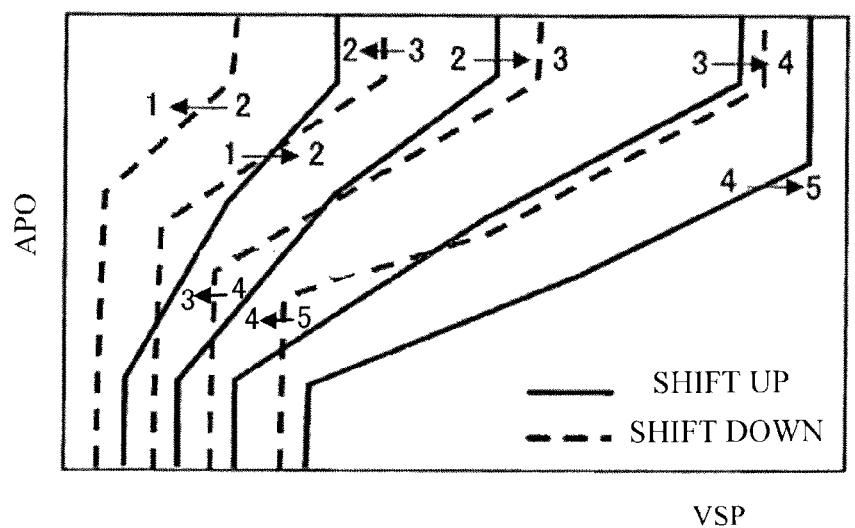
FIG. 10 is a gearshift graph of an automatic transmission mounted in a hybrid vehicle.

In step S64, the operational point instructing unit 60 determines the target gear position SHIFT based on the accelerator pedal opening APO and the vehicle speed VSP using a predetermined gearshift map illustrated in FIG. 10 and instructs the target gear position SHIFT to the transmission controller 70 of FIG. 5 to cause the automatic transmission 3 to perform a gearshift to the target gear position SHIFT. In FIG. 10, the solid line indicates an up-shift line between neighboring gear positions, and the dotted line indicates a down-shift line between neighboring gear positions. It is noted that, if the switching from the EV mode to the HEV mode is in progress even when crossing across the up-shift or down-shift line occurs so that a corresponding gearshift request is issued, this gearshift request is not executed until the corresponding mode switching is completed. Instead, the corresponding gearshift is performed after the mode switching is completed.

In step S65, the operational point instructing unit 60 obtains the target engine torque tTe as follows.

In the HEV mode, first, an ideal engine torque tTeO is computed based on the input rotational speed Ni of the automatic transmission 3, the engine rotational speed Ne, and the target input torque tTi obtained in step S62 using the following equation.

$$tTeO = (tTi \times Ni - tP)/Ne \quad (2).$$

Figure 11:
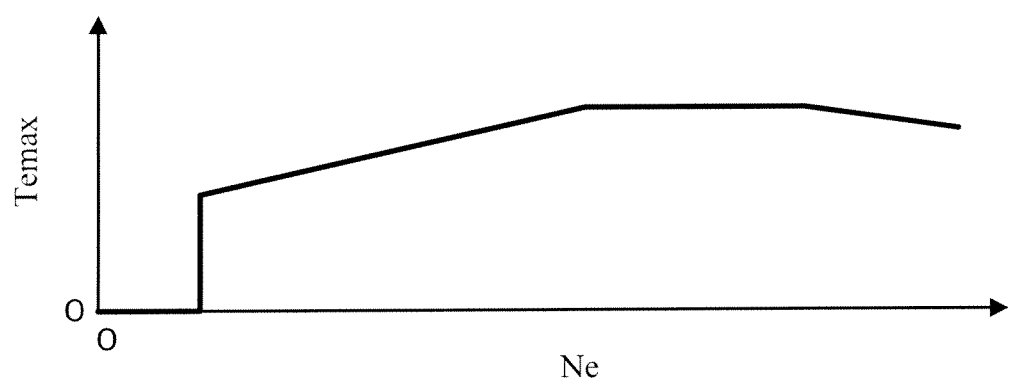
FIG. 11 is a graph illustrating a characteristic of a maximum allowable torque of an internal combustion engine mounted in a hybrid vehicle.

A maximum engine torque Temax corresponding to the engine rotational speed Ne is obtained based on the maximum engine torque map illustrated in FIG. 11, and the ideal engine torque tTeO obtained using the aforementioned equation is controlled so as not to exceed the maximum engine torque Temax. The resulting value is set to the target engine torque tTe. In the EV mode, the target engine torque tTe is set to zero since no engine torque is necessary.

If switching of the drive mode is in progress, the target engine torque tTe is determined depending on the operation performed in the mode switching described below in detail.

The target engine torque tTe determined as described above is instructed to the engine controller 21 of FIG. 4, and the engine controller 21 controls the internal combustion engine 1 such that the target engine torque tTe is implemented.

In step S66 corresponding to a motor/generator control means according to the present invention, if either the EV mode or the HEV mode is executed, the operational point instructing unit 60 computes the target motor/generator torque tTm using the following equation.

$$tTm = tTi - tTe \quad (3)$$

When the switching is in progress, the target motor/generator torque tTm is determined depending on the operation performed during the mode switching described below.

The target motor/generator torque tTm determined in this manner is instructed to the motor/generator controller 22 of FIG. 4. The motor/generator controller 22 controls the motor/generator 5 using an inverter 10 such that the target motor/generator torque tTm is implemented.

In step S67 corresponding to a first-clutch engagement control means according to the present invention, the operational point instructing unit 60 determines the target transfer torque capacity tTc1 of the first clutch 6 as follows.

In the EV mode, since the first clutch 6 is released, the target transfer torque capacity tTc1 is set to zero. In the HEV mode, since the first clutch 6 is engaged, the target first-clutch transfer torque capacity tTc1 is set to the maximum value. In the middle of the mode switching, the target first-clutch transfer torque capacity tTc1 is determined depending on the operation performed in the middle of the mode switching described below.

The target first-clutch transfer torque capacity tTc1 determined in this manner is converted into the target first-clutch solenoid current IS1 as illustrated in FIG. 5 and is used in the engagement control of the first clutch 6 as illustrated in FIG. 4. The engagement control of the first clutch 6 is performed to implement the target first-clutch transfer torque capacity tTc1.

In step S68 corresponding to a second-clutch engagement control means according to the present invention, the operational point instructing unit 60 determines the target transfer torque capacity tTc2 of the second clutch 7 as follows.

In the EV mode, the target second-clutch transfer torque capacity tTc2 is set to the maximum drive force equivalent value EVTmax (maximum transfer torque capacity of the second clutch in the EV mode) in the EV mode. In the HEV mode, the target second-clutch transfer torque capacity tTc2 is set to the maximum value.

In the middle of the mode switching, the target second-clutch transfer torque capacity tTc2 is determined depending on the operation performed in the middle of the mode switching described below.

The target second-clutch transfer torque capacity tTc2 determined in this manner is used in the engagement control of the second clutch 7 using the transmission controller 70 of FIG. 5. The engagement control of the second clutch 7 is performed to implement the target second-clutch transfer torque capacity tTc2.

In other words, the target second-clutch transfer torque capacity tTc2 is instructed to the transmission controller 70 of FIG. 5 along with the target gear position SHIFT and is provided to control a gearshift to the target gear position SHIFT of the automatic transmission 3.

Figure 12:
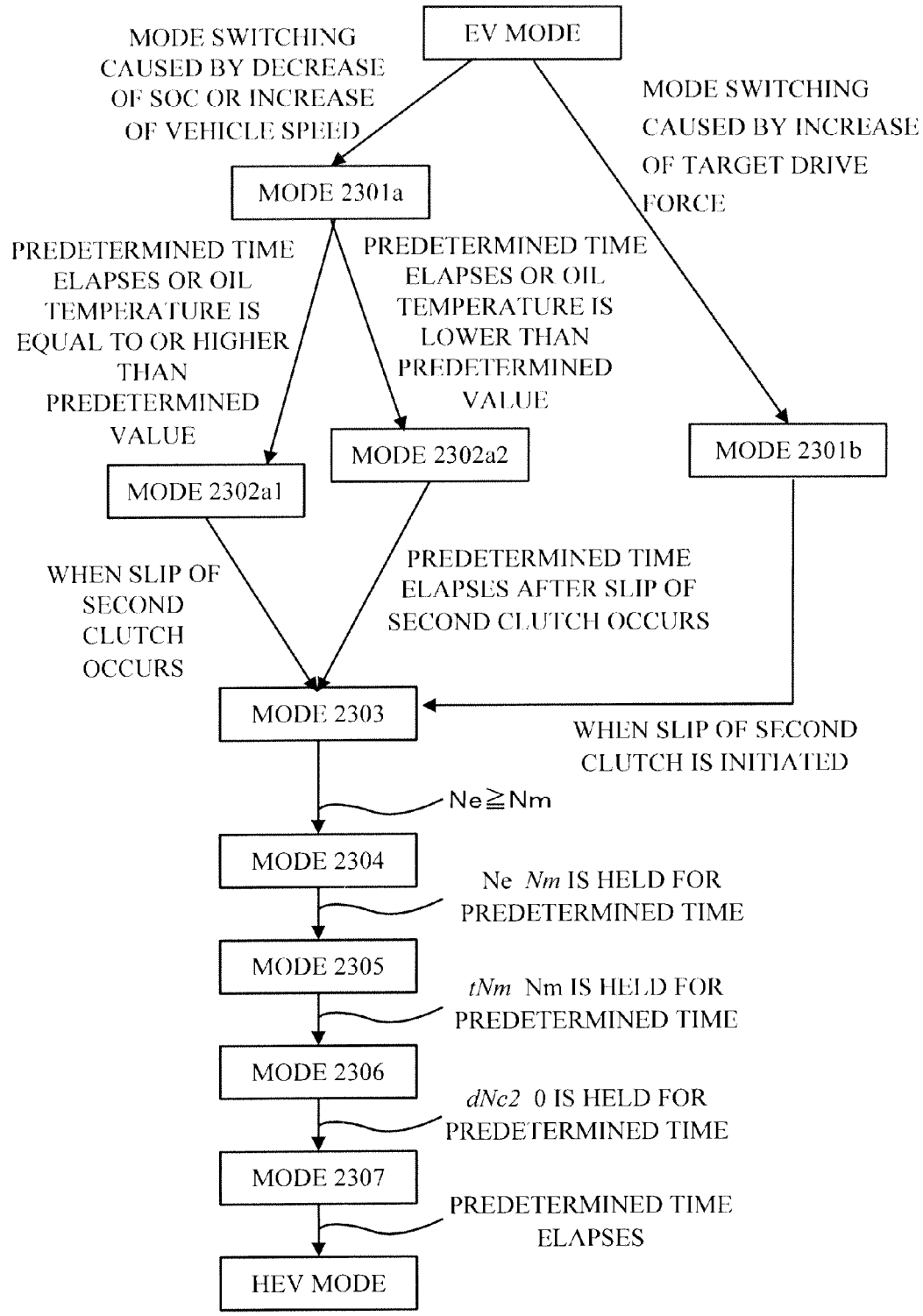
FIG. 12 is a mode transition map when a hybrid vehicle switches from an electric vehicle (EV) mode to a hybrid electric vehicle (HEV) mode.

Hereinafter, switching control from the EV mode to the HEV mode which generates an engine start according to the present invention will be described with reference to the state transition diagram of FIG. 12 and the timing charts of FIGS. 13 and 14.

Figure 13:
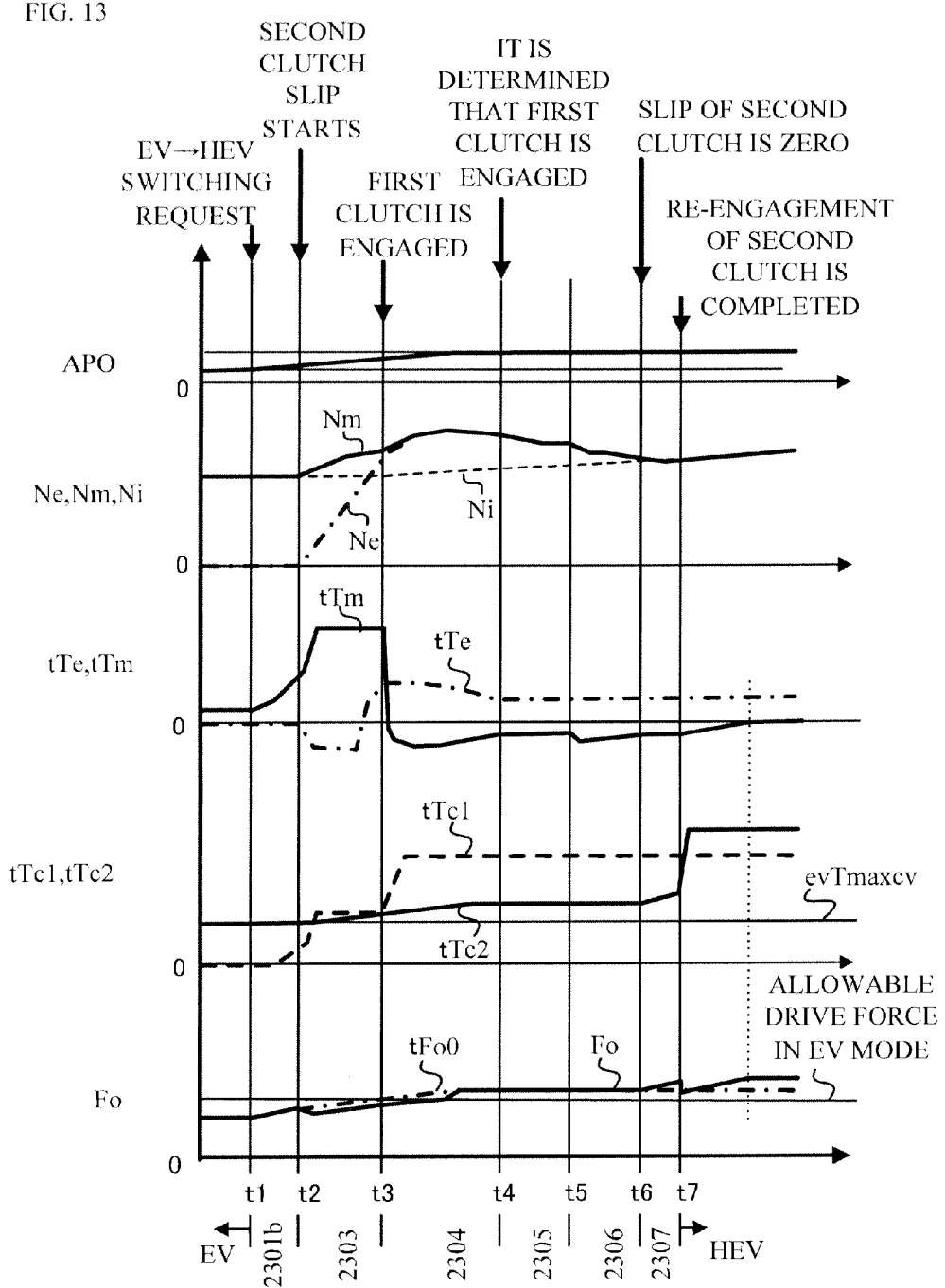
FIG. 13 is an operational timing chart of the control program of FIG. 6 when switching from an electric vehicle (EV) mode to a hybrid electric vehicle (HEV) mode occurs as an accelerator is operated.

As the accelerator pedal opening APO increases as illustrated in FIG. 13 (as the target drive force increases) during the EV mode, the operational point changes, for example, from the point A to the point A' in FIG. 8, so that the target mode is set to the HEV mode, and the mode switching from the EV mode to the HEV mode occurs. In this case, as illustrated in FIGS. 12 and 13, first, the mode switching from the EV mode to the mode 2301b is initiated. Then, the mode transits to the HEV mode through the modes 2303 to 2307.

The modes 2301b and 2303 to 2307 will be described in detail hereinafter.

If the vehicle speed VSP increases even when the accelerator pedal opening APO is constant during the EV mode, the operational point may shift, for example, from the point B to the point B' in FIG. 8, so that the target mode is set to the HEV mode, and mode switching from the EV mode to the HEV mode occurs. Alternatively, if the state of charge SOC of the battery decreases even when the operational point is fixed, for example, to the C-point in FIG. 8, the target mode may be set to the HEV mode, so that mode switching from the EV mode to the HEV mode occurs. In these cases, first, mode switching is initiated from the EV mode to the mode 2301a, and then, the process transits to the mode 2302a (mode 2302a1 or 2302a2), to the modes 2303 to 2307, and to the HEV mode.

Here, mode switching from the EV mode to the HEV mode through the mode 2301b caused when the accelerator pedal opening increases, that is, when the target drive force increases as in the former case will be described with reference to FIGS. 12 and 13.

Since this mode switching relates to a request for switching from the EV mode to the HEV mode (engine start request) caused by stepping on the accelerator pedal, mode switching (engine start) having a high-speed response capable of rapidly increasing the drive force is desirable rather than smooth mode switching (engine start).

In addition, even when a shock is generated in the mode switching (engine start), a driver does not feel the shock because a drive force changes depending on the accelerator manipulation.

In this regard, the mode switching control through the mode 2301b is performed as follows.

The mode switching is initiated when the process transits to the mode 2301b at the switching request timing t1 (FIG. 13) from the EV mode to the HEV mode caused by stepping on the accelerator pedal. In the mode 2301b, a drive force within a range allocatable to the second clutch 7 is generated in the EV mode. On the other hand, if a drive force exceeding the range allocatable to the second clutch 7 is generated, control is performed as follows in order to cause the second clutch 7 to start to slip as quickly as possible.

<Engagement Control of First Clutch 6>

Since it is necessary to quickly start the internal combustion engine 1 as described above, cranking of the internal combustion engine 1 (engine rotational speed Ne ≤0) is initiated by virtue of the drag torque of the first clutch 6 before the second clutch 7 starts to slip by increasing the target first-clutch transfer torque capacity tTc1 as illustrated in FIG. 13.

It is noted that, if the drag torque of the first clutch 6 is excessively large, the drive force decreases, so that a sense of deceleration is generated. Therefore, in order to prevent this problem, the target first-clutch transfer torque capacity tTc1 is set as follows.

$$tTc1 < Tmmax - tTi \quad (4)$$

Here, Tmmax denotes a maximum torque of the motor/generator 5.

<Engagement Control of Second Clutch 7>

As described above, in the mode 2301b, a drive force within a range allocatable to the second clutch 7 is generated in the EV mode. On the other hand, if a drive force exceeds the range allocatable to the second clutch 7, the target second-clutch transfer torque capacity tTc2 in the mode 2301b remains in the maximum drive force equivalent value EVTmax in the EV mode as illustrated in FIG. 13 in order to cause the second clutch 7 to start to slip as quickly as possible.

<Control of Internal Combustion Engine 1>

In the mode 2301b, the target engine torque tTe in the mode 2301b is set to zero as illustrated in FIG. 13 because the engine has not yet started.

<Control of the Motor/Generator 5>

In the mode 2301b, in order to suppress decrease of the drive force caused by the drag torque of the first clutch 6, a torque value expressed in the following equation, obtained by adding the drag torque compensation tTc1 of the first clutch 6 to the target transmission input torque tTi for implementing transitional target drive force tFo, is provided as a target motor/generator torque tTm as illustrated in FIG. 13.

$$tTm = tTi + tTc1 \quad (5)$$

<Condition for Transition to Next Mode 2303>

In the middle of the aforementioned control, the second clutch 7 starts to slip if the torque input to the second clutch 7 from the motor/generator 5 exceeds the second-clutch maximum transfer torque capacity EVTmax in the EV mode held at the maximum drive force equivalent value in the EV mode due to increase of the target motor/generator torque tTm generated when the target transmission input torque tTi increases as the accelerator pedal opening APO increases. In this manner, at the timing t2 of FIG. 13 in which the second clutch 7 starts to slip, the process transits from the mode 2301b to the next mode 2303.

The torque transmitted to the second clutch 7 before and after the second clutch 7 starts to slip switches from the torque of the motor/generator 5 to the transfer torque capacity equivalent Tc2 of the second clutch 7 continuously or stepwise. Therefore, the drive force does not have an abrupt change, and smoothness thereof is obtained.

In order to cause the second clutch 7 to slip while the drag torque of the first clutch 6 is obtained, it is necessary to set the transfer torque capacity Tc2 of the second clutch 7 within the drive force range that can be output in the EV mode. According to the present embodiment, since the second-clutch transfer torque capacity Tc2 is maintained at the maximum drive force equivalent value that can be output in the EV mode from the middle of the EV mode. Therefore, it is possible to shorten time for lowering a hydraulic pressure for engaging the second clutch 7 to the drive force range that can be output in the EV mode. As a result, it is possible to improve a response in increase of the drive force caused by the engine start.

In the mode 2303 after the transition (timing t2), control is performed as follows such that the engine starts using the drag torque of the first clutch 6 while the second clutch 7 slips in order to alleviate a shock caused by the drive force change in the engagement of the first clutch 6.

<Engagement Control of Second Clutch>

When the second clutch 7 slips, the output torque of the second clutch becomes the second clutch transfer torque capacity no matter how much torque change is generated in the input side of the second clutch 7.

In this regard, in the mode 2303, the target second-clutch transfer torque capacity tTc2 is determined based on the following equation.

$$tTc2 = tTi \quad (6)$$

This target second-clutch transfer torque capacity tTc2 is raised to match the rise in the transitional target drive force tFo0 (target transmission input torque tTi) as illustrated in FIG. 13.

<Engagement Control of First Clutch 6>

The target transfer torque capacity tTc1 of the first clutch 6 in the mode 2303 is set to a value within the range expressed in the following equation in order to increase the drive force and hold a stable slip of the second clutch 7.

$$Tc1\min < tTc1 < Tm\max - tTc2 = Tm\max - tTi \quad (7)$$

Here, Tc1min is set to an engine friction value if engine ignition has not yet started. Tc1min is set to zero if the engine ignition has started.

<Control of Internal Combustion Engine 1>

In the mode 2303, control is performed such that the internal combustion engine 1 starts as cranking of the internal combustion engine 1 starts.

<Control of Motor/Generator 5>

In the motor/generator control in the mode 2303, for example, the target motor/generator rotational speed tNm for attaining the target slippage dNc2 of the second clutch 7 is obtained using the following equation.

$$tNm = Ni + dNc \quad (8)$$

The rotational speed of the motor/generator 5 is controlled using a PI-controller (P denotes a proportional controller, and I denotes an integral controller) such that the motor/generator rotational speed Nm matches this target value tNm.

In such PI-control, the motor/generator torque tTm changes in synchronization of the clutch torque change generated when the first clutch 6 is engaged as illustrated in FIG. 13. Therefore, it is possible to stably perform control of the rotational speed of the motor/generator 5.

However, if only the PI-controller is used, a rotational speed changes due to a drag torque load of the first clutch 6, and then, the motor/generator torque tTm changes to suppress this rotational speed change. In order to compensate for the rotational speed change (torque change) of the first clutch 6 caused by the motor/generator torque tTm, a temporary reduction amount of the motor/generator rotational speed increases. Therefore, it is necessary to obtain a large slippage of the second clutch 7.

In this regard, a component for compensating for the torque change of the first-clutch 6 on a feed-forward control basis depending on the target first-clutch transfer torque capacity tTc1 may be applied to the target motor/generator torque tTm.

When the feed-forward compensation is applied in this manner, it is possible to quickly compensate for the torque change of the first clutch 6 using the motor/generator. As a result, it is possible to suppress a temporary reduction amount of the motor/generator rotational speed and reduce a slippage of the second clutch so as to suppress heat generation thereof.

For the same purpose, instead of the feed-forward control described above, a disturbance observer based on a rotational inertia system of the motor/generator may be used such that disturbance is estimated by considering torques other than the motor/generator torque applied to the motor/generator 5 as disturbance, and the motor/generator torque is corrected using this disturbance estimation value to compensate for the disturbance.

As another method of holding a slip of the second clutch 7 without using the rotational speed control, there is known a method of performing open control of the motor/generator 5 such that the target motor/generator torque tTm becomes greater than a value obtained by adding the drag torque compensation equivalent tTc1 of the first clutch 6 to the drive force equivalent (corresponding to the transfer torque capacity tTc2 of the second clutch 7) as expressed in the following equation.

$$tTm > tTc2 + tTc1 \quad (9)$$

<Condition for Transition to Next Mode 2304>

In the control described above, the process transits from the mode 2303 to the mode 2304 in order to suppress overshooting of the engine rotational speed Ne at timing t3 in FIG. 13 at which the engine rotational speed Ne is equal to or higher than the motor/generator rotational speed Nm.

Through the control described above, a slip state of the second clutch 7 is stably held even when the engagement of the first clutch 6 is completed. Therefore, even when the engagement of the first clutch 6 is completed, or the transfer torque of the first clutch 6 abruptly changes due to a reversal in the difference of the rotation between the front and rear sides of the clutch, it is possible to avoid the transfer torque change of the first clutch generated accordingly from being transmitted to the automatic transmission 3. Therefore, it is possible to start the engine without feeling a shock and suppress heat generation in the second clutch 7.

In the mode 2304, control is performed as follows in order to suppress overshooting of the engine rotational speed Ne.

<Engagement Control of Second Clutch 7>

In the mode 2304, the second clutch 7 still slips. Therefore, the transmission input torque Ti is equal to the second-clutch transfer torque capacity tTc2.

In this regard, the target second-clutch transfer torque capacity tTc2 in the mode 2304 is determined based on the equation (6) described above and is set depending on the transitional target drive force tFo as illustrated in FIG. 13.

<Engagement Control of First Clutch 6>

In the mode 2304, the engagement of the first clutch 6 is completed as described above. Therefore, the target first clutch transfer torque capacity tTc1 in this mode is set to the maximum transfer torque capacity as illustrated in FIG. 13.

<Control of Internal Combustion Engine 1>

In the mode 2304, the engagement of the first clutch 6 is completed, and the engine has started. Therefore, the target engine torque in the HEV mode is set to the target engine torque tTe.

<Control of Motor/Generator 5>

Similar to the mode 2303, in the motor/generator control in the mode 2304, for example, in order to achieve the target second-clutch slippage dNc2, the target motor/generator rotational speed tNm is obtained using the equation (8) described above. Then, rotational speed control of the motor/generator 5 is performed such that the motor/generator rotational speed Nm matches this target value tNm, or open control of the motor/generator 5 is performed such that the target motor/generator torque tTm is greater than a value obtained by adding the drag torque compensation tTc1 of the first clutch 6 to the drive force equivalent (corresponding to the transfer torque capacity tTc2 of the second clutch 7) as expressed in the equation (5) described above.

<Condition for Transition to Next Mode 2305>

At timing t4 in FIG. 13 at which the engine rotational speed Ne is nearly equal to the motor/generator rotational speed Nm for a predetermined time after timing t3 in FIG. 13 at which the engine rotational speed Ne becomes equal to or higher than the motor/generator rotational speed Nm, the process transits from the mode 2304 to the mode 2305 based on determination that the engagement of the first clutch 6 is reliably completed.

Through the control described above, a slip state of the second clutch 7 is stably held even when the engagement of the first clutch 6 is completed. Therefore, even when the engagement of the first clutch 6 is completed, or a transfer torque of the first clutch 6 abruptly changes due to a reversal of the rotational difference between the front and rear sides of the clutch, it is possible to avoid the transfer torque change of the first clutch generated accordingly from being transmitted to the drive wheel 2. In addition, it is possible to start the engine without feeling a shock and suppress heat generation in the second clutch 7.

In the mode 2305, in order to suppress a shock at the time of re-engagement of the second clutch 7, the following control state is set such that the torque input to the second clutch 7 from the internal combustion engine 1 and the motor/generator 5 matches the transfer torque capacity of the second clutch 7.

<Engagement Control of Second Clutch 7>

In the mode 2305, since the second clutch 7 still slips. Therefore, the transmission input torque Ti is equal to the transfer torque capacity tTc2 of the second clutch.

In this regard, the target second-clutch transfer torque capacity tTc2 in the mode 2305 is determined as expressed in the equation (6) described above and is set depending on the transitional target drive force tFo as illustrated in FIG. 13.

<Engagement Control of First Clutch 6>

In the mode 2305, the engagement of the first clutch 6 is completed as described above. Therefore, the target first-clutch transfer torque capacity tTc1 in this mode is set to the maximum transfer torque capacity as illustrated in FIG. 13.

<Control of Internal Combustion Engine 1>

In the mode 2305, the engagement of the first clutch 6 is completed, and the engine has started. Therefore, the target engine torque in the HEV mode is set to the target engine torque tTe.

<Control of Motor/Generator 5>

In the motor/generator control in the mode 2305, in order to prepare smooth engagement of the second clutch 7 in the subsequent modes 2306 and 2307, the target motor/generator rotational speed tNm is obtained using the equation (8) described above such that the target slippage dNc2 of the second clutch 7 is stably achieved. In addition, the rotational speed control of the motor/generator 5 is performed such that the motor/generator rotational speed Nm matches this target value tNm.

<Condition for Transition to Next Mode 2306>

At timing t5 in FIG. 13 at which it is determined that the motor/generator rotational speed Nm approaches the target motor/generator rotational speed tNm for a predetermined time after timing t4 in FIG. 13 at which it is determined that the engine rotational speed Ne is nearly equal to the motor/generator rotational speed Nm for a predetermined time (it is determined that the engagement of the first clutch 6 is completed), overshooting of rotation or a torque change is suppressed, and the second clutch 7 has a stable slip state at a certain speed. In addition, if it is determined that the torque input to the second clutch 7 from the internal combustion engine and the motor/generator 5 is nearly equal to the second-clutch transfer torque capacity Tc2, the process transits from the mode 2305 to the mode 2306.

Here, initially, an objective is not to set the slip of the second clutch 7 to zero, but to obtain a predetermined slippage in order to suppress generation of a drive force change caused by a reversal of the slip direction of the second clutch 7 due to undershooting of the motor/generator rotational speed.

In the mode 2306, the following control state is set in order to suppress generation of a drive force change caused by a reversal of the slip direction of the second clutch 7 due to undershooting of the motor/generator rotational speed Nm while the torque input to the second clutch 7 from the internal combustion engine 1 and the motor/generator 5 is nearly equal to the transfer torque capacity Tc2 of the second clutch 7.

<Engagement Control of Second Clutch 7>

In the mode 2306, the second clutch 7 still slips. Therefore, the transmission input torque Ti is equal to the transfer torque capacity tTc2 of the second clutch.

In this regard, the target second-clutch transfer torque capacity tTc2 in the mode 2306 is determined as expressed in the equation (6) described above and is set depending on the transitional target drive force tFo as illustrated in FIG. 13.

<Engagement Control of First Clutch 6>

In the mode 2306, the engagement of the first clutch 6 is completed as described above. Therefore, the target first clutch transfer torque capacity tTc1 in this mode is set to the maximum transfer torque capacity as illustrated in FIG. 13.

<Control of Internal Combustion Engine 1>

In the mode 2306, the engagement of the first clutch 6 is completed, and the engine has been started. Therefore, the target engine torque in the HEV mode is set to the target engine torque tTe.

<Control of Motor/Generator 5>

In the motor/generator control in the mode 2306, the target motor/generator rotational speed tNm is determined based on the equation (8) described above while the target second-clutch slippage dNc2 is slowly reduced to zero in order to decrease a change rate of the target second-clutch slippage dNc2 as the target second-clutch slippage dNc2 decreases. In addition, the rotational speed of the motor/generator 5 is controlled such that the motor/generator rotational speed Nm matches this target value tNm.

<Condition for Transition to Next Mode 2307>

At timing t6 at which a state that the target second-clutch slippage dNc2 approaches zero is continuously held for a predetermined time after timing t5 in FIG. 13, the process transits to the mode 2307 to re-engage the second clutch 7.

In this manner, if the second clutch 7 is re-engaged when the target second-clutch slippage dNc2 approaches zero, the second clutch 7 is re-engaged while the torque input to the second clutch 7 from the internal combustion engine 1 and the motor/generator 5 is nearly equal to the second-clutch transfer torque capacity tTc2. Therefore, it is possible to suppress a torque change in the re-engagement of the second clutch 7 even when the transfer torque of the second clutch 7 switches from the transfer torque capacity Tc2 to a combined torque of the engine torque and the motor/generator torque.

In the mode 2307, since the second clutch 7 is re-engaged while the torque input to the second clutch 7 from the internal combustion engine 1 and the motor/generator 5 is nearly equal to the transfer torque capacity Tc2 of the second clutch 7, the following control state is set.

<Engagement Control of Second Clutch 7>

In some cases, in the rotational speed control of the motor/generator 5, it may take time until the rotation difference between the front and rear sides of the second clutch 7 is reliably set to zero due to accuracy of the rotation sensor or influence of a disturbance torque.

In this regard, in the mode 2307, as the slippage of the second clutch 7 is reduced to a certain level, the slippage of the second clutch 7 is smoothly eliminated, and the second clutch 7 is re-engaged by slowly increasing the target transfer torque capacity tTc2 of the second clutch 7 to be equal to or smaller than an allowable drive force change as illustrated in FIG. 13 through open control.

<Engagement Control of First Clutch 6>

In the mode 2307, the first clutch 6 has an engagement state. Therefore, the target first-clutch transfer torque capacity tTc1 in this mode is set to the maximum transfer torque capacity as illustrated in FIG. 13.

<Control of Internal Combustion Engine 1>

In the mode 2307, the first clutch 6 has an engagement state, and the engine has been started. Therefore, the target engine torque in the HEV mode is set to the target engine torque tTe.

<Control of Motor/Generator 5>

In the mode 2307, as the target motor/generator torque tTm, the value instructed at timing t6 is held as illustrated in FIG. 13.

<Condition for Transition to Next Mode 2307>

At timing t7 after a predetermined time elapses from timing t6 in FIG. 13, the process transits to the HEV mode to terminate switching from the EV mode to the HEV mode.

Through the control described above, it is possible to smoothly re-engage the second clutch 7 without a shock and completely perform mode switching from the EV mode to the HEV mode, which causes the engine start.

It is noted that, in a case where the torque input to the second clutch 7 from the internal combustion engine 1 and the motor/generator 5 is made to be nearly equal to the second-clutch transfer torque capacity Tc2 using the rotational speed control of the motor/generator 5, a deviation ΔTm is generated between the target motor/generator torque tTm and the motor/generator torque Tm in the HEV mode at timing t7 at which the mode 2307 is terminated (refer to FIG. 13) because a gap or a disturbance torque between the target engine torque tTe and the actual engine torque Te is compensated using the motor/generator torque.

For this reason, as the target motor/generator torque tTm is changed to the target motor/generator torque in the HEV mode immediately after timing t7 at which the mode switches to the HEV mode, a drive force change is generated due to a deviation ΔTm in the motor/generator torque, which serves as a shock.

However, if such a motor/generator torque deviation ΔTm remains, it serves as interference in obtaining a desired charge/discharge capacity.

In this regard, it is possible to prevent an abrupt change of the drive force and a shock generated accordingly by slowly reducing the deviation ΔTm in the motor/generator torque to zero from timing t7 of FIG. 13 in the HEV mode.

As described above, in the switching from the EV mode to the HEV mode, the internal combustion engine 1 starts through cranking using the drag torque of the first clutch 6 while the second clutch 7 slips. After the engine start, the second clutch 7 is engaged. Since the second clutch 7 slips, it is possible to prevent a torque change generated in the start of the internal combustion engine 1 or the engagement of the first clutch 6 from being transmitted to the drive wheel.

On the other hand, in a case where the EV mode is selected again after the accelerator pedal is recovered during the start operation of the internal combustion engine 1 as the mode switches from the EV mode to the HEV mode by increasing the accelerator pedal opening (hereinafter, simply referred to as "a case where the accelerator pedal is recovered"), the engine stops after the engine start is completed. However, a sense of deceleration is not generated until the second clutch 7 is engaged. In this regard, the following control is performed in order to quickly generate a sense of deceleration.

Figure 14:
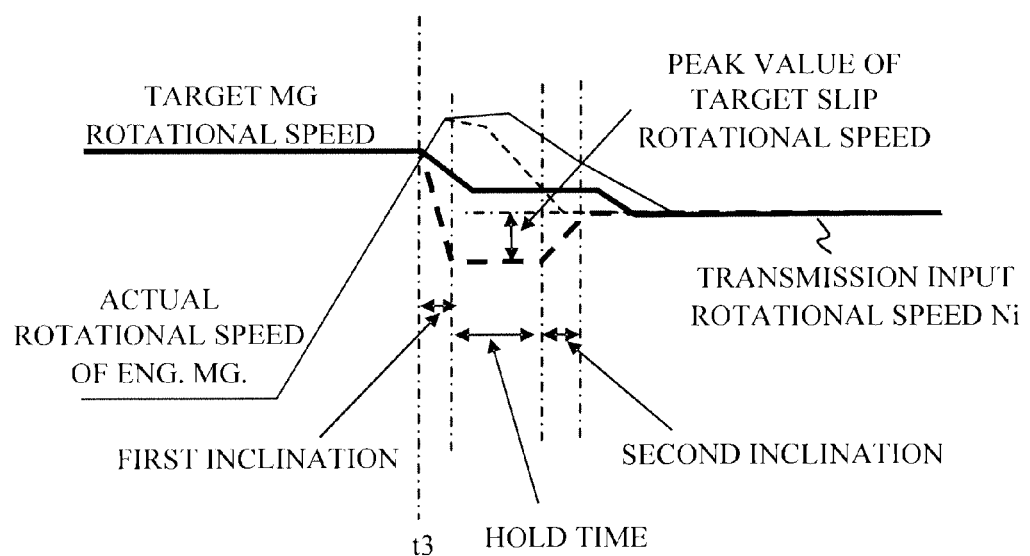
FIG. 14 is a diagram illustrating a method of setting a target motor/generator rotational speed.
Figure 15:
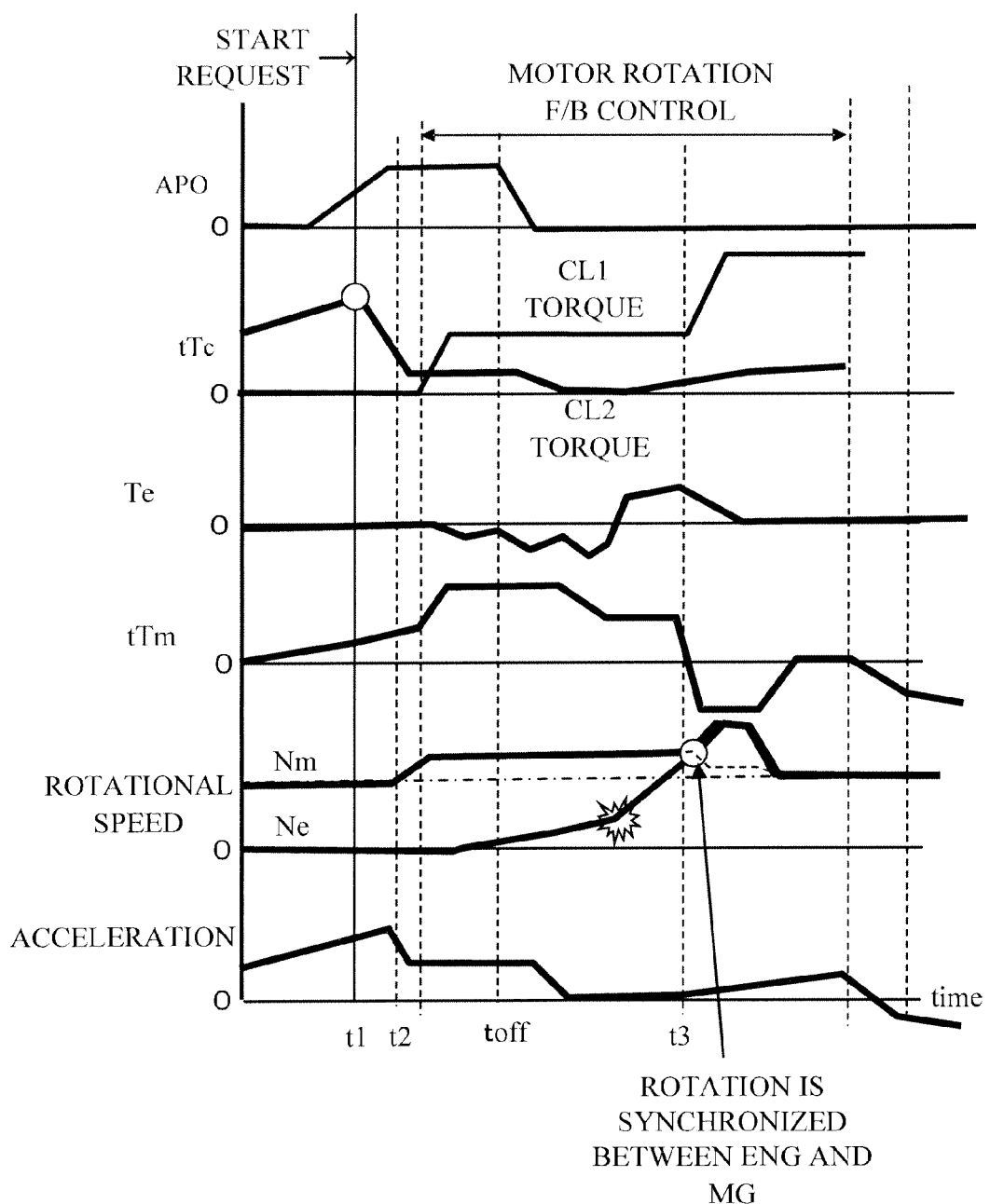
FIG. 15 is a timing chart illustrating a result of executing rotational speed control for a motor/generator in related art.

FIG. 14 is a diagram illustrating the target rotational speed tNm after the first clutch 6 is engaged and a behavior of the actual rotational speed in a case where the rotational speed control of the motor/generator 5 is performed based on the target rotational speed tNm of the motor/generator 5. In FIG. 15, the solid line indicates a result of the control performed while the accelerator pedal is pressed, and the dotted line indicates a result of the control performed when the accelerator pedal is recovered during the start operation.

Whether or not the accelerator pedal is recovered during the start operation may be determined based on the detection signal of the accelerator pedal opening sensor 15. As the accelerator pedal is released, the mode selection unit 40 selects switching from the HEV mode to the EV mode. Therefore, it may be determined that the accelerator pedal is recovered based on this switching selection. In any determination method, it is possible to determine that the accelerator pedal is recovered without separately providing a detection means.

The operational point instructing unit 60 sets a change characteristic of the target motor/generator rotational speed tNm in order to converge the slip rotation of the second clutch 7. Specifically, a peak value of the target slip rotational speed, an inclination (first inclination) until the peak value is reached, a peak hold time, and an inclination (second inclination) until the peak value is converged to the transmission input rotational speed are set with reference to a table prepared in advance.

In a case where the accelerator pedal is continuously pressed, it is necessary to hold the slip of the second clutch 7 until a hydraulic pressure of the second clutch 7 is obtained with a stable engine torque, and then engage the second clutch 7 in order to absorb a torque change caused by the start of the internal combustion engine 1. Similarly, in a case where the accelerator pedal is recovered during the start operation, a change characteristic of the target motor/generator rotational speed tNm is set in such a consideration. As a result, the change characteristic becomes the solid line of FIG. 14. That is, the target motor/generator rotational speed tNm is held in a rotational speed higher than the transmission input rotational speed for a predetermined time and then decreases to the transmission input rotational speed.

On the contrary, in a case where the accelerator pedal is recovered during the start operation, as illustrated in the dotted line of FIG. 14, a peak value of the target slip rotational speed is set to a value lower than the transmission input rotational speed Ni. It is assumed that the peak value of the target slip rotational speed is set by applying the current selected gear position and the coefficient determined for each accelerator pedal opening in advance to the transmission input rotational speed Ni. As the recovery amount of the accelerator pedal increases, the coefficient decreases. When the accelerator pedal is released, the coefficient becomes a negative value. The first inclination, the second inclination, and the peak hold time are also set with reference to a table, which may be created in advance for each accelerator pedal opening.

As indicated by the dotted line of FIG. 14, if the peak value of the target slip rotational speed is set to be lower than the transmission input rotational speed Ni, the torque of the motor/generator 5 is exerted more dominantly to the negative side. Accordingly, the time elapsing until the slip of the second clutch 7 is converged becomes shorter than the time established using a method similar to a case where the accelerator pedal is continuously pressed. As a result, generation of a sense of deceleration is expedited.

Figure 16:
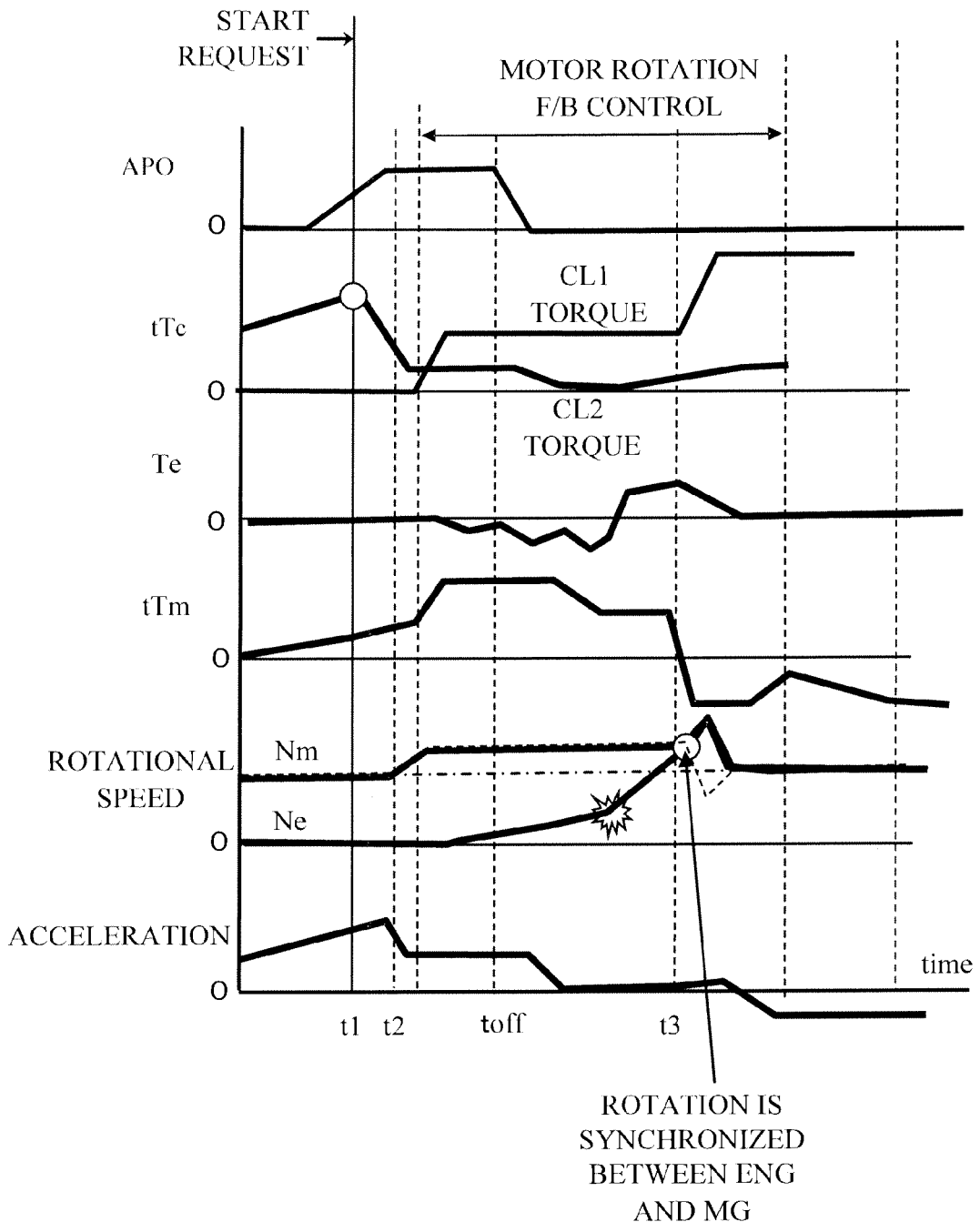
FIG. 16 is a timing chart illustrating a result of executing rotational speed control for a motor/generator according to the present invention.

FIG. 15 is a timing chart illustrating a change characteristic of the target motor/generator rotational speed tNm controlled using the change characteristic indicated by the solid line of FIG. 14 in a case where a request for the start of the internal combustion engine 1 is issued as the accelerator pedal opening increases, and the accelerator pedal is recovered before the start operation is completed. FIG. 16 is a timing chart when control is performed using the change characteristic indicated by the dotted line of FIG. 14. In FIGS. 15 and 16, the timing t1 to t3 corresponds to timing t1 to t3 of FIG. 13. In FIGS. 15 and 16, the chart of the engagement torque capacity of the second clutch 7 shows a pattern of hydraulic depression when the slip starts. Therefore, the torque capacity decreases after the start request is issued. However, similar to FIG. 13, the torque capacity may be constantly maintained without performing hydraulic depression.

In both FIGS. 15 and 16, the dotted line in the chart of the motor/generator rotational speed indicates a change characteristic of the target motor/generator rotational speed tNm. It is noted that the peak hold time of the target slip rotational speed is set to zero in FIG. 16.

Once the start operation of the internal combustion engine 1 starts, the start operation continuously progresses even when the accelerator pedal is released at the timing toff before the start operation is completed. Then, the internal combustion engine 1 stops after the engine rotational speed is synchronized with the motor/generator rotational speed. Therefore, there is no difference between FIGS. 15 and 16 until timing t3 at which the engine rotational speed is synchronized with the motor/generator rotational speed.

In FIG. 15, the target motor/generator rotational speed tNm gradually decreases after timing t3. Therefore, an actual rotational speed of the motor/generator 5 does not decrease immediately. Instead, a peak value obtained after the actual rotational speed is synchronized with the actual engine rotational speed is held, and then, the actual rotational speed decreases.

Meanwhile, in FIG. 16, after timing t3, the target motor/generator rotational speed tNm decreases to a value lower than the transmission input rotational speed Ni within a short time, and the torque of the motor/generator 5 is exerted dominantly to the negative side. Therefore, the actual rotational speed of the motor/generator 5 also starts to decrease quickly.

Therefore, the time elapsing until the slip of the second clutch 7 becomes zero is shortened in FIG. 16, compared to FIG. 15. As a result, the time elapsing until the acceleration starts to decrease after timing t3, that is, the time elapsing until a sense of deceleration is generated is also shortened in FIG. 16, compared to FIG. 15.

Although description has been made for a case where the rotational speed control of the motor/generator 5 is performed using the target motor/generator rotational speed tNm, the rotational speed control may be performed such that the motor/generator rotational speed resultantly has the change characteristic of FIG. 16 by limiting the actual torque of the motor/generator 5. The effect may be similarly obtained by controlling a torque of the motor/generator 5. In this case, it is possible to resultantly obtain a change characteristic of the motor/generator rotational speed as illustrated in FIG. 16 by setting the target torque tTm such that the slip convergence time of the second clutch 7 is shortened.

The effect of the present embodiment can be summarized as follows. In the hybrid vehicle illustrated in FIG. 1 and the like, the start operation is continuously performed even when the accelerator pedal opening decreases during the control of the second clutch 7 to start the internal combustion engine 1 for mode switching from the EV mode to the HEV mode. The motor/generator 5 is controlled such that the torque of the motor/generator 5 exerting to reduce the slippage of the second clutch 7 increases compared to a case where the accelerator pedal opening does not decrease during the slip engagement. As a result, it is possible to shorten the time elapsing until the differential rotation of the second clutch 7 is converged to zero and quickly generate a sense of deceleration.

Similarly, the start operation is continuously performed even when the accelerator pedal opening decreases after the start operation of the internal combustion engine 1 is initiated during the mode switching from the EV mode to the HEV mode until the start operation is terminated. In addition, if the rotation is synchronized between the internal combustion engine 1 and the first clutch 6, the motor/generator 5 is controlled such that the torque of the motor/generator 5 exerting to reduce the slippage of the second clutch 7 increases compared to a case where the accelerator pedal opening does not decrease during the mode switching. As a result, it is possible to shorten the time elapsing until the slip of the second clutch 7 is converged and quickly generate a sense of deceleration.

The rotational speed control of the motor/generator 5 may be performed by setting the target rotational speed tNm. In addition, a limitation may be applied to a drive torque of the motor/generator 5 during the rotational speed control. Furthermore, the torque may be controlled by setting a target drive torque.

For example, in a case where the accelerator pedal opening becomes zero, the target rotational speed of the motor/generator 5 is set to be lower than the transmission input rotational speed such that the torque of the motor/generator 5 exerting to reduce the slippage of the second clutch 7 increases as the accelerator pedal opening decreases. Therefore, it is possible to generate a sense of deceleration depending on a driver's intention.

While the invention has been described with reference to certain embodiments, they are only exemplary applications of the present invention and not intended to limit the invention.

This application claims priority from Japanese Patent Application No. 2010-239388, filed on Oct. 26, 2010 in the Japan Patent Office, the entire disclosure of which is incorporated herein by reference.

The invention claimed is:

1. A control device for a hybrid vehicle having an internal combustion engine as a power source, a motor/generator as a power source, a first clutch interposed between the internal combustion engine and the motor/generator and capable of changing a transfer torque capacity continuously or stepwise, and a second clutch interposed between the motor/generator and the drive wheel and capable of changing a transfer torque capacity continuously or stepwise, so as to select a drive mode between an electric vehicle mode in which a vehicle is driven only using power from the motor/generator by releasing the first clutch and engaging the second clutch and a hybrid electric vehicle mode in which a vehicle is driven using power from both the internal combustion engine and the motor/generator by engaging both the first and second clutches, the control device comprising:
a first-clutch engagement control unit configured to engage the first clutch when a mode switches to the hybrid electric vehicle mode from the electric vehicle mode;
a second-clutch engagement control unit configured to slip-engage the second clutch when the internal combustion engine starts using the first-clutch engagement control unit; and
a motor/generator control means configured to increase a torque of the motor/generator exerting to reduce a slippage of the second clutch as an accelerator pedal opening decreases while the second clutch is controlled to start the internal combustion engine for switching from the electric vehicle mode to the hybrid electric vehicle mode, compared to a case where the accelerator pedal opening does not decrease during the slip-engagement.

2. The control device for a hybrid vehicle according to claim 1, wherein the motor/generator control unit controls the motor/generator such that, as an accelerator pedal opening decreases between initiation and termination of a start operation of the internal combustion engine during the switching from the electric vehicle mode to the hybrid electric vehicle mode, a torque of the motor/generator exerting to reduce a slippage of the second clutch after rotation of the internal combustion engine is synchronized with rotation of the motor/generator increases, compared to a case where the accelerator pedal opening does not decrease during the mode switching.

3. The control device for a hybrid vehicle according to claim 1, wherein the motor/generator control unit performs control such that a torque of the motor/generator exerting to reduce the slippage of the second clutch increases as the accelerator pedal opening during the mode switching decreases.

4. The control device for a hybrid vehicle according to claim 1, wherein the motor/generator control unit sets a target rotational speed of the motor/generator depending on a vehicle drive state, controls a rotational speed of the motor/generator such that an actual rotational speed of the motor/generator matches the target rotational speed, and controls a magnitude of the torque of the motor/generator exerting to reduce the slippage of the second clutch by setting of the target rotational speed.

5. The control device for a hybrid vehicle according to claim 1, wherein the motor/generator control unit sets a target rotational speed of the motor/generator depending on a vehicle drive state, controls a rotational speed of the motor/generator such that an actual rotational speed of the motor/generator matches the target rotational speed, and controls a magnitude of the torque of the motor/generator exerting to reduce the slippage of the second clutch by limiting a drive torque during control of the rotational speed of the motor/generator.

6. The control device for a hybrid vehicle according to claim 1, wherein the motor/generator control unit sets a target drive torque of the motor/generator depending on a vehicle drive state, controls a drive torque of the motor/generator such that an actual drive torque of the motor/generator matches the target drive torque, and controls a magnitude of the torque of the motor/generator exerting to reduce the slippage of the second clutch by limiting the target drive torque.

7. The control device for a hybrid vehicle according to claim 1, wherein the motor/generator control unit sets a target motor/generator rotational speed lower than a rotational speed of a drive wheel side of the second clutch after the first clutch has engaged.

8. The control device for a hybrid vehicle according claim 1, wherein whether or not an accelerator pedal opening decreases during the mode switching is determined based on a detection value of an accelerator pedal opening sensor.

9. The control drive for a hybrid vehicle according to claim 1, further comprising a drive unit configured to select any one of the electric vehicle mode or the hybrid electric vehicle mode based on an accelerator pedal opening and a vehicle speed,
wherein it is determined that the accelerator pedal opening decreases when the electric vehicle mode is selected in the hybrid electric vehicle mode during the mode switching.

10. A control device for a hybrid vehicle having an internal combustion engine as a power source, a motor/generator as a power source, a first clutch interposed between the internal combustion engine and the motor/generator and capable of changing a transfer torque capacity continuously or stepwise, and a second clutch interposed between the motor/generator and the drive wheel and capable of changing a transfer torque capacity is driven using power from both the internal combustion engine and the motor/generator by engaging both the first and second clutches,
the control device comprising:
a first-clutch engagement control means for engaging the first clutch when a mode switches to the hybrid electric vehicle mode from the electric vehicle mode;
a second-clutch engagement control means configured to slip-engage the second clutch when the internal combustion engine starts using the first-clutch engagement control means; and
a motor/generator control means configured to increase a torque of the motor/generator exerting to reduce a slippage of the second clutch as an accelerator pedal opening decreases while the second clutch is controlled to start the internal combustion engine for switching from the electric vehicle mode to the hybrid electric vehicle mode, compared to a case where the accelerator pedal opening does not decrease during the slip-engagement.

* * * * *